2,910,415

METHOD FOR THE SIMULTANEOUS PRODUCTION OF HYDROGEN PEROXIDE AND CARBONYL COMPOUNDS

Fujio Mashio and Shinichi Kato, Kyoto, Japan, assignors to Fine Organics Inc., New York, N.Y., a corporation of New York No Drawing. Application September 4, 1957
Serial No. 681,886

5 Claims. (Cl. 204—158)

The object of this invention is to provide a new method for the simultaneous production of hydrogen peroxide and carbonyl compounds through the liquid-phase oxidation of alcohols by oxygen. The basis of the process is the oxidation of organic compounds by molecular oxygen, under ultraviolet radiation in the presence of titanium dioxide, which is a very effective catalyst for photoxidation.

Hydrogen peroxide is important in synthetic chemistry, bleaching, and as an oxidizing agent in rocket-propellant systems. The present processes for its manufacture are unavoidably expensive.

There are many well known methods for the preparation of hydrogen peroxide, e.g.: electrolysis; electric discharge in an atmosphere of hydrogen and oxygen; and synthesis from oxygen and hydrogen, using an organic compound as a carrier of the latter. In recent years the incomplete oxidation of hydrocarbons has been investigated.

In our method, the alcohols are oxidized to the corresponding carbonyl compounds, with the simultaneous generation of hydrogen peroxide. This reaction proceeds so smoothly that the absorbed oxygen is converted nearly quantitatively to hydrogen peroxide, while the alcohols are converted to aldehydes or ketones. The usual oxidation of alcohols gives only hydrogen or water besides the carbonyl compound, while our process gives hydrogen peroxide.

In other words, it might be said that aldehydes or ketones are produced by our method as by-products during the preparation of hydrogen peroxide, or, on the other hand, that hydrogen peroxide is produced as a by-product during the preparation of aldehydes or ketones. It is in this sense of producing two valuable products simultaneously that this is a most economical process. Moreover, by this process, there is no necessity to prepare the hydrogen carrier or to handle it repeatedly.

In this process, the autoxidation of the alcohols to give hydrogen peroxide and carbonyl compounds is initiated by titanium dioxide which has photoxidative catalytic properties.

Titanium dioxide absorbs the ultraviolet radiation and releases atomic oxygen, which initiates the autoxidation of the alcohols. The titanium dioxide which has lost part of its oxygen may be reoxidized in an atmosphere of oxygen. Because of this reoxidative capacity, titanium dioxide is a long lasting catalyst. It has been found that various grades of titanium dioxide have varying catalytic powers. The various types of titanium dioxide may be classified as being of high, middle or low activity according to the following scheme:

Any one of the reactions described herein is run using one gram of titanium dioxide as catalyst, ultraviolet light of 3656 A., and a radiation of $10^{-8}$ Einstein units/sec. Samples are withdrawn and analyzed at suitable intervals. From the results of these analyses, the reaction rate may be calculated.

In this specification, the following system of classification of the activity of titanium dioxide has been used:

| Reaction rate of initiation: | Activity class |
|---|---|
| Above $10 \times 10^{-9}$ mol./sec. | High |
| Between $3 \times 10^{-9}$ mol./sec. and $10 \times 10^{-9}$ mol./sec. | Middle |
| Below $3 \times 10^{-9}$ mol./sec. | Low |

The general procedure to be followed in this process is as follows: to a primary or secondary alcohol, less than 10% by weight of titanium dioxide is added, mixed, and air or oxygen is introduced to the homogeneously dispersed mixture under the irradiation of ultraviolet light.

This process should be carried out at the highest possible temperature that will not cause decomposition of hydrogen peroxide. Such a temperature lies between 50 and 150° C. Good yields may be obtained at these temperatures, which are generally below those used in the non-catalyzed oxidation of alcohols, and thus the loss of hydrogen peroxide due to thermal decomposition is markedly reduced.

The rate of oxidation in this process is independent of the oxygen partial pressure above 100 mm. Hg. If it is necessary to operate at temperatures higher than the boiling point of the alcohol, it is advantageous to operate under pressure.

When an alcohol of high purity is used as a starting material the reaction has very little induction period, and there is no reduction in the efficiency of the catalyst throughout the reaction period.

The ultraviolet radiation used in this process must have a wave length between 3000 and 4000 A., and for this purpose a mercury lamp is suitable.

The reaction vessel for this process may be made of glass, aluminum or its alloys, tin, porcelain, or any other structural material coated with these materials or with enamel or resin.

Since such metals as cobalt, manganese, chromium, antimony, iron, silver and copper and their compounds reduce the activity of the catalyst and induce the decomposition of hydrogen peroxide, the presence of these metals or their compounds should be avoided.

The process may be applied to primary and secondary aliphatic, hydroaromatic and aromatic alcohols, especially ethanol, isopropanol, cyclohexanol and benzyl alcohol.

The process can be operated either continuously or intermittently.

In the intermittent method, the alcohol and titanium dioxide are charged into a reaction vessel equipped with a reflux condenser and a stirrer, the mixture is exposed to ultraviolet radiation and oxygen is blown in. The amount of the produced hydrogen peroxide increases proportionally with that of the absorbed oxygen. When the desired hydrogen peroxide concentration is reached, the batch is removed from the reactor.

For continuous processing, the above mentioned equipment need only be modified to the extent of fitting the reactor with an inlet and a drain of such construction that they may be used while the reaction is proceeding. The reaction is then run in the same manner as indicated above, and when the desired hydrogen peroxide concentration is reached, continuous draining of the reaction mixture and continuous addition of an alcohol/titanium dioxide mixture are started at such rates as to keep the reaction at steady state.

An alternative continuous process is also possible. In such process an alcohol-titanium-dioxide mixture is passed through a quartz tube together with a stream of oxygen while being irradiated with ultraviolet light.

For reasons of safety it is desirable to keep the hydrogen peroxide concentration below 25%.

The titanium dioxide which is removed from the reaction vessel along with the reaction products may be recovered by centrifuging, filtering or setting.

The separation of the carbonyl compound and the hydrogen peroxide may be done by fractional distillation, precipitation of the hydrogen peroxide as a metal peroxide, solvent extraction of the carbonyl compound, or by an addition reaction of the carbonyl compound.

*Example 1*

A flat bottomed glass flask was used as a reaction vessel. This was connected to a constant pressure oxygen burette. The flask was placed in a constant temperature bath. Ultraviolet light was supplied by a 150 watt high pressure mercury lamp. Isopropanol, plus 1% by weight of middle activity titanium dioxide, were charged to the flask. The mixture was agitated, held at 80° C., and oxygen led in. The oxygen absorption rate was 0.04 mole/liter/hour. After 24 hours the hydrogen peroxide concentration reached 3.5% and that of acetone 5.7%.

*Example 2*

A 20 liter vitreous enameled iron vessel equipped with a high pressure mercury lamp was used as a reaction vessel. Isopropanol with 1% titanium dioxide of high activity was oxidized at 100° C. under an oxygen pressure of two atmospheres. The rate of oxygen absorption was about 0.12 mol/liter/hour. After thirty hours the hydrogen peroxide concentration reached about 10% and the acetone concentration 16%. The reaction mass was withdrawn and the titanium dioxide separated by centrifuging. The liquor was diluted with half its volume of water containing sodium pyrophosphate and 8-oxyquinoline. The acetone and isopropanol were removed by vacuum distillation, leaving a 25% hydrogen peroxide solution.

*Example 3*

Using the same apparatus as in Example 1, cyclohexanol with 1% titanium dioxide was oxidized at 90° C. The rate of oxygen absorption was 0.05 mol/liter/hour and the hydrogen peroxide concentration reached 4.2% after 30 hours. The charge was drawn off and the titanium dioxide recovered by centrifuging. The liquor was diluted with an equal amount of benzene, and the peroxide extracted with ⅕ volume of water, yielding an 8.5% hydrogen peroxide solution. The benzene layer was then extracted with a 5% solution of $NaHSO_3$ in water, and the cyclohexanone was transferred completely to the water as the $NaHSO_3$ addition product. Cyclohexanone was recovered from this by the addition of potassium carbonate. The unreacted cyclohexanol was recovered from the benzene by distillation.

Having described our invention, what we claim, and desire to secure by Letters Patent, is as follows:

1. A process for the simultaneous production of hydrogen peroxide and a carbonyl compound which consists in the photocatalytic oxidation of an alcohol by an oxygen containing gas using titanium dioxide as a catalyst in the presence of ultraviolet light whereby the alcohol is oxidized to the corresponding carbonyl compound and hydrogen peroxide is simultaneously formed, and recovering the formed carbonyl compound.

2. A process according to claim 1 in which the photocatalytic oxidation is effected at between 50 and 150° C.

3. A process according to claim 1 in combination with an oxygen partial pressure of greater than 100 mm. Hg.

4. A process according to claim 1, employing less than 10% by weight of titanium dioxide based on the weight of the alcohol to be oxidized.

5. A process according to claim 1, in which the alcohol undergoing oxidation is a member of the group consisting of primary and secondary aliphatic, hydroaromatic, and aromatic, alcohols.

References Cited in the file of this patent

Jacobsen: Industrial and Engineering Chemistry, vol. 41 (March 1949), No. 3, pp. 523, 525 and 526.